_United States Patent Office_ 3,340,307
Patented Sept. 5, 1967

3,340,307
PROCESS FOR MANUFACTURE OF THIO-PHENOL FROM ALKALI METAL CYCLOHEXANE SULFONATES
Jared Abell, Pleasant Hill, Calif., assignor to Chevron Research Company, San Francisco, Calif., a corporation of Delaware
No Drawing. Filed July 27, 1965, Ser. No. 475,277
8 Claims. (Cl. 260—609)

This invention relates to a novel method for the production of thiophenol from alkali metal salts of cyclohexanesulfonic acid.

Thiophenol, per se, is a useful organic chemical and as an intermediate in chemical syntheses.

It has now been found that thiophenol can be produced by heating alkali metal cyclohexanesulfonate salts to a temperature in the range above about 250° C. but below about 500° C.

The chemical equation for the reaction which is believed to take place is as follows:

$$C_6H_{11}SO_3M \xrightarrow{\text{Heat}} C_6H_5SH\uparrow + MOH + 2H_2O$$

Alkali metal salts of cyclohexanesulfonic acid in general appear to yield thiophenol in the process. For practical reasons, alkali metals having atomic numbers below 56 are contemplated. Sodium cyclohexanesulfonate is the preferred process feed compound.

In the process non-acidic inert refractory metal oxides are desirably employed in finely divided fluidized solid bed form as heat exchange agents to prevent or minimize local superheating of the salt charges. Representative examples include silica, alumina, magnesia, and the like. Basic alumina is preferred.

The following examples are set forth for purposes of illustration and are not intended to be limiting.

*Example 1*

Into a distillation flask was charged sodium cyclohexanesulfonate. The flask was fitted with a reflux column and a Dry Ice cooled receiver. The flask and charge were then heated by a surrounding Woods metal bath and the following observations made:

| Time, min. | Temp., ° C. | Observation |
|---|---|---|
| 0 | 100 | Water in column. |
| 54 | 411 | Milky liquid in reflux column. |
| 97 | 430 | Some evidence of cracking in reactor. |
| 152 | ¹409 | |

¹ Off.

Using vapor phase chromatographic techniques and appropriate standards, the resulting product was analyzed and found to be accounted for as follows.

| Product: | Mol percent yield |
|---|---|
| Thiophenol | 15 |
| Benzene | 15 |
| Cyclohexene | 20 |
| High boiling sulfide | 5 |

*Example 2*

As in Example 1, sodium cyclohexanesulfonate was charged to a distillation flask and additionally finely powdered basic (i.e., cationotropic) alumina (Woelm) was also charged and intimately mixed into the salt. The relative portions by weight of salt and alumina were roughly 1:2. The flask and charge were heated as in Example 1 except that a temperature of about 400° C. was maintained while passing a stream of an inert gas, nitrogen, through the flask and into the receiver.

Using the same analytical techniques as in Example 1, the following results were noted.

| Product: | Mol percent yield |
|---|---|
| Thiophenol | 18 |
| Benzene | 16 |
| Cyclohexene | 13 |
| High boiling sulfides | 3 |

*Example 3*

As in Example 1, except that barium cyclohexanesulfonate, ammonium cyclohexanesulfonate and cyclohexanesulfonic acid were heated to substantially the same and higher temperatures. No thiophenol was detectable in the product. In the case of the barium salt, the charge was recovered substantially unchanged.

I claim:
1. Process for the production of thiophenol which comprises heating to a temperature in the range from about 250° to 500° C., a cyclohexanesulfonate salt of the general formula $C_6H_{11}SO_3M$, wherein M is an alkali metal having an atomic number less than 57.
2. Process of claim 1 wherein an inert gas is passed through during said heating.
3. The process of claim 1 wherein said heating is effected in the presence of basic alumina.
4. The process of claim 3 wherein said alumina is maintained in a fluidized particulate solid bed.
5. Process for the production of thiophenol which comprises heating sodium cyclohexanesulfonate to a temperature in the range from about 250° to 500° C.
6. Process of claim 5 wherein an inert gas is passed through during said heating.
7. Process of claim 5 wherein said heating is in the presence of an inert refractory metal oxide.
8. Process of claim 5 wherein said heating is in the presence of basic alumina.

References Cited

UNITED STATES PATENTS 2,947,788   7/1960   Pitt _____ 260—608

CHARLES B. PARKER, *Primary Examiner.*

D. R. PHILLIPS, *Assistant Examiner.*